United States Patent
Shim et al.

(10) Patent No.: US 10,320,480 B2
(45) Date of Patent: Jun. 11, 2019

(54) MOBILE TERMINAL HAVING GUIDING MEMBER FOR GUIDING A DIRECTION OF VISIBLE LIGHT EMITTED FROM A LIGHT SOURCE

(71) Applicant: LG ELECTRONICS INC., Seoul (KR)

(72) Inventors: Hongjo Shim, Seoul (KR); Gukchan Lim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/749,082

(22) PCT Filed: Aug. 12, 2015

(86) PCT No.: PCT/KR2015/008446
§ 371 (c)(1),
(2) Date: Jan. 30, 2018

(87) PCT Pub. No.: WO2017/026555
PCT Pub. Date: Feb. 16, 2017

(65) Prior Publication Data
US 2018/0227051 A1    Aug. 9, 2018

(51) Int. Cl.
*H04B 10/116* (2013.01)
*G01J 1/44* (2006.01)
(Continued)

(52) U.S. Cl.
CPC .......... *H04B 10/116* (2013.01); *G01J 1/0219* (2013.01); *G01J 1/0233* (2013.01);
(Continued)

(58) Field of Classification Search
CPC ........ H04B 10/116; H04B 10/40; H04B 1/38; G01J 1/44; G01J 1/0219; G01J 1/0233;
(Continued)

(56) References Cited

U.S. PATENT DOCUMENTS 8,704,906 B2 *  4/2014  Yamamoto ............. H04N 5/235
                                                          348/221.1
8,909,058 B2 * 12/2014  Sheu ....................... H04B 10/40
                                                          398/138
(Continued)

FOREIGN PATENT DOCUMENTS

KR    101447602    *  7/2014
KR    101447602      10/2014

OTHER PUBLICATIONS

Copending U.S. Appl. No. 15/746,256 (Claims filed on Jan. 19, 2018).*

(Continued)

*Primary Examiner* — Luong T Nguyen
(74) *Attorney, Agent, or Firm* — Lee, Hong, Degerman, Kang & Waimey

(57) ABSTRACT

A structure of a mobile terminal for visible light communication is disclosed. The mobile terminal, according to one embodiment of the present invention, comprises: a light reception unit for receiving visible light; and a control unit for extracting, from the received visible light, data corresponding to the turning on/off of an external lighting, wherein the light reception unit comprises at least one among an illuminance sensor, a first image sensor disposed on the front of the mobile terminal, and a second image sensor disposed on the back of the mobile terminal, and comprises a guide member for guiding the traveling direction of visible light outputted from the lighting.

17 Claims, 9 Drawing Sheets

(51) Int. Cl.
- *H04B 1/38* (2015.01)
- *H04N 5/232* (2006.01)
- *G01J 1/02* (2006.01)
- *G01J 1/42* (2006.01)
- *H04M 1/737* (2006.01)
- *H04M 1/22* (2006.01)
- *H04M 1/725* (2006.01)

(52) U.S. Cl.
CPC ........... *G01J 1/0271* (2013.01); *G01J 1/4204* (2013.01); *G01J 1/44* (2013.01); *H04B 1/38* (2013.01); *H04M 1/737* (2013.01); *H04N 5/232* (2013.01); *G01J 2001/446* (2013.01); *H04M 1/22* (2013.01); *H04M 1/7253* (2013.01); *H04M 2250/12* (2013.01)

(58) Field of Classification Search
CPC .. G01J 1/0271; G01J 1/4204; G01J 2001/446; H04N 5/232; H04L 7/0075; H04M 1/737; H04M 1/22; H04M 1/7253; H04M 2250/12

See application file for complete search history.

(56) References Cited

U.S. PATENT DOCUMENTS

| | | | |
|---|---|---|---|
| 9,086,318 B1* | 7/2015 | Baldwin | G01J 1/04 |
| 2008/0319354 A1* | 12/2008 | Bell | A61B 5/11 |
| | | | 600/595 |
| 2009/0041476 A1 | 2/2009 | Ann et al. | |
| 2010/0098439 A1 | 4/2010 | Shin et al. | |
| 2013/0182200 A1* | 7/2013 | Ishizumi | G02B 6/0036 |
| | | | 349/65 |
| 2014/0232903 A1 | 8/2014 | Oshima et al. | |
| 2015/0189149 A1 | 7/2015 | Oshima et al. | |
| 2015/0192438 A1* | 7/2015 | Choi | G06F 1/1626 |
| | | | 73/431 |
| 2016/0049449 A1* | 2/2016 | Kim | H01L 27/307 |
| | | | 257/40 |
| 2018/0212679 A1* | 7/2018 | Shim | H04B 10/116 |

OTHER PUBLICATIONS

PCT International Application No. PCT/KR2015/008446, Written Opinion of the International Searching Authority dated May 12, 2016, 27 pages.

\* cited by examiner

FIG. 4
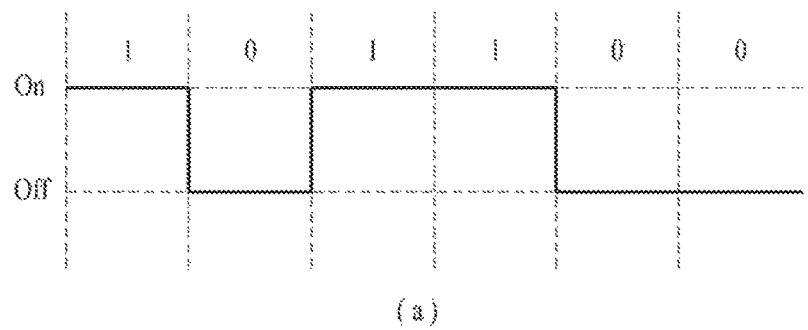
(a)
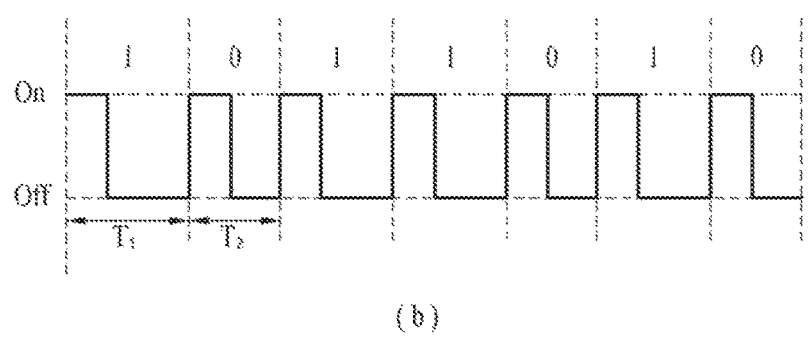
(b)
FIG. 5
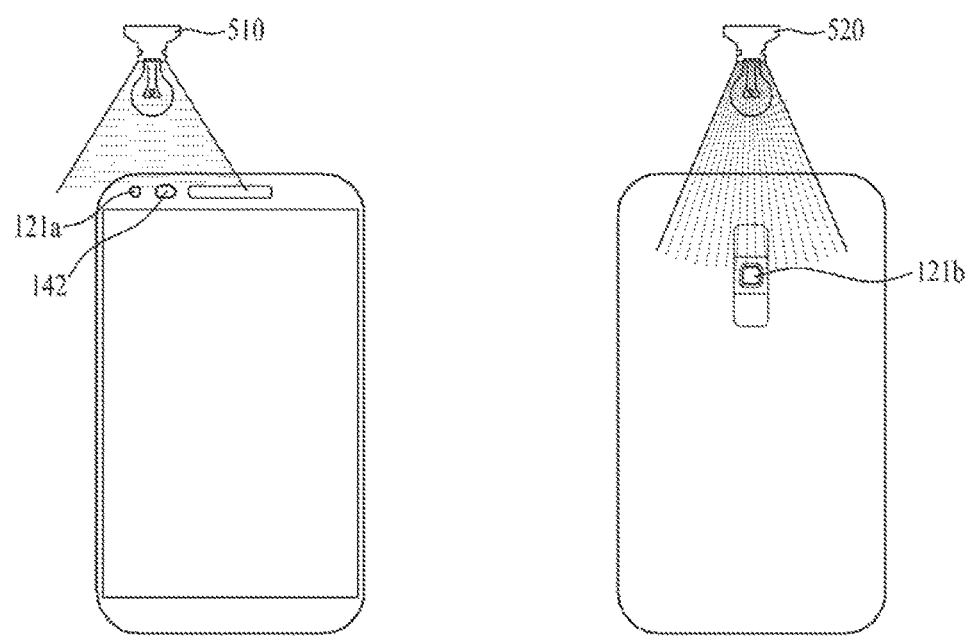

(a)          (b)

MOBILE TERMINAL HAVING GUIDING MEMBER FOR GUIDING A DIRECTION OF VISIBLE LIGHT EMITTED FROM A LIGHT SOURCE

CROSS-REFERENCE TO RELATED APPLICATIONS

This application is the National Stage filing under 35 U.S.C. 371 of International Application No. PCT/KR2015/008446, filed on Aug. 12, 2015, the contents of which are all hereby incorporated by reference herein in its entirety.

TECHNICAL FIELD

The present invention relates to a mobile terminal capable of facilitating the use of the terminal in further consideration of user's convenience.

BACKGROUND ART

In recent years, a terminal has been implemented as a multimedia player with multiple functions.

To support and increase the functionality of the terminal, many efforts are made to improve not only the structural components of the terminal but also software thereof.

Visible light communication (which is also called Li-Fi) means a short-range communication technology using visible light containing digital data. Although the visible light communication has a limitation in that communication is possible only in an area where light is present, that is, communication becomes impossible when there is no light or light is blocked by an object, the visible light communication has advantages in that it has a high level of security and can be used in a place where use of electromagnetic waves is limited such as an airplane or hospital.

Recently, since people generally carry their mobile terminals with them everywhere, a method for performing visible light communication using a mobile terminal without a separate device needs to be developed.

DISCLOSURE OF THE INVENTION

Technical Task

The technical task of the present invention is to provide a mobile terminal structure suitable for performing visible light communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a mobile terminal, including: a light receiving unit configured to receive visible light; and a controller configured to extract data corresponding to ON/OFF of an external light source from the received visible light. In this case, the light receiving unit may include at least one of an illumination sensor, a first image sensor disposed on a front surface of the mobile terminal, and a second image sensor disposed on a rear surface of the mobile terminal. In addition, the light receiving unit may include a guide member for guiding a direction of the visible light emitted from the light source.

Advantageous Effects

According to the present invention, a mobile terminal structure suitable for performing visible light communication can be provided.

DESCRIPTION OF DRAWINGS

FIG. 4 is a diagram for explaining an example of a method for extracting data from visible light received by the mobile terminal according to one embodiment of the present invention.

FIG. 5 is a diagram for explaining an example of a method for receiving visible light from each of a plurality of external light sources at the mobile terminal according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
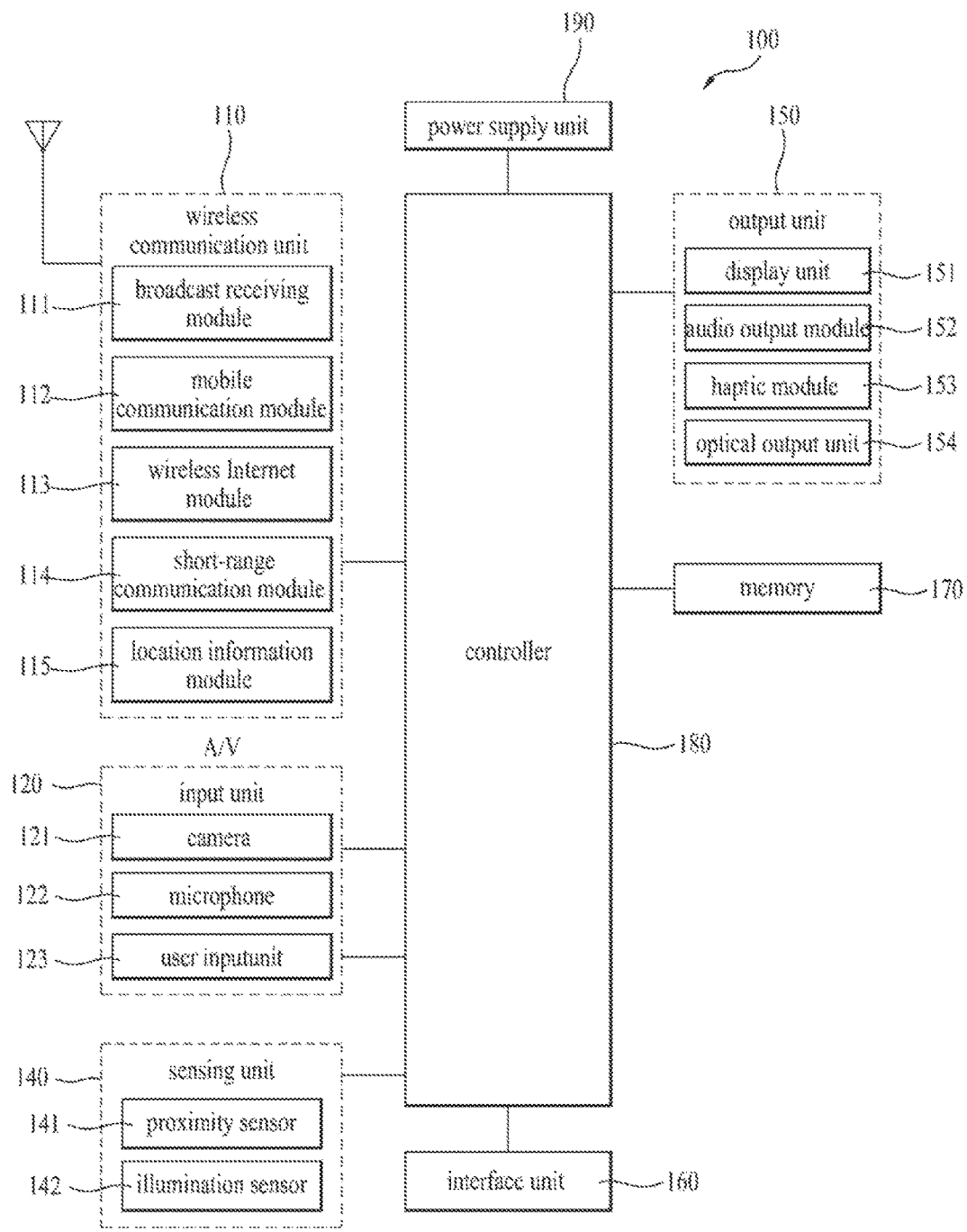
FIG. 1A is a block diagram of a mobile terminal in accordance with the present disclosure.
Figure 1B:
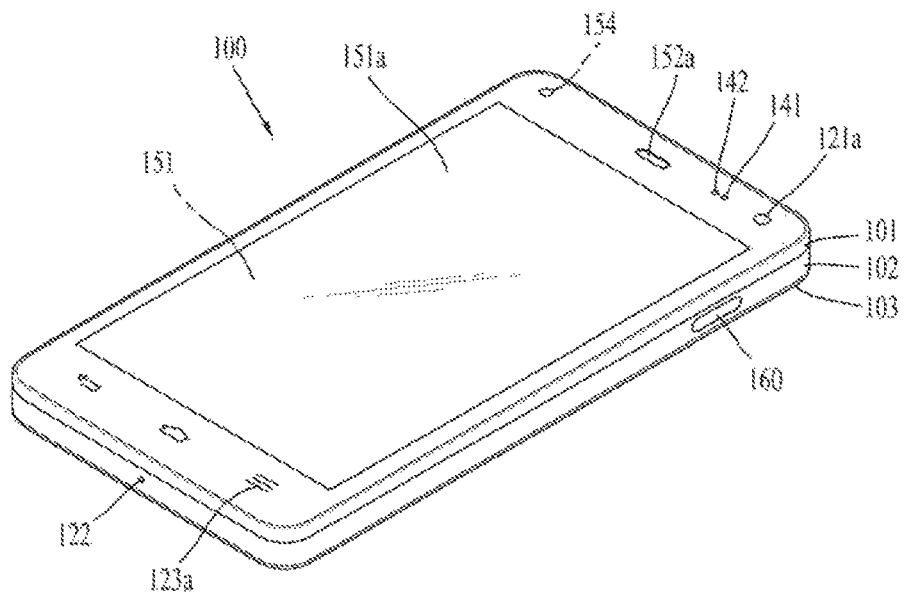
FIGS. 1B and 1C are conceptual views of one example of the mobile terminal, viewed from different directions.
Figure 1C:
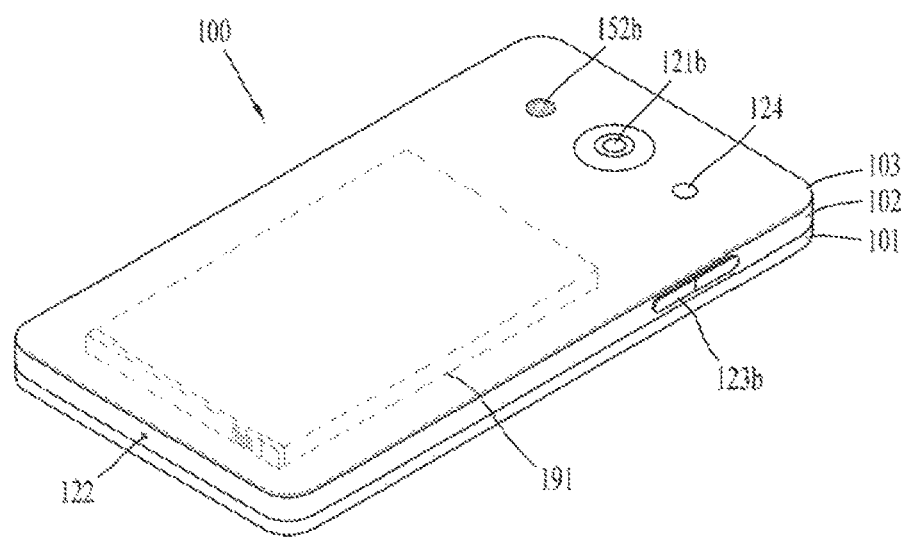

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like.

Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways.

For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body.

Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided.

The cover or pouch may cooperate with the display unit 151 to extend the function of the mobile terminal 100. Another example of the accessory is a touch pen for assisting or extending a touch input to a touch screen.

Hereinafter, examples of methods for performing visible light communication using the mobile terminal according to one embodiment of the present invention will described with reference to FIGS. 2 to 19.

According to one embodiment of the present invention, in performing the visible light communication, the mobile terminal 100 may operate as a receiver for receiving visible light emitted from an external light source, which is turned on/off according to predetermined conditions or a transmitter for transmitting visible light through a light output unit, which is turned on/off according to predetermined conditions. Here, the external light source may include a light emitting diode (LED).

Figure 2:
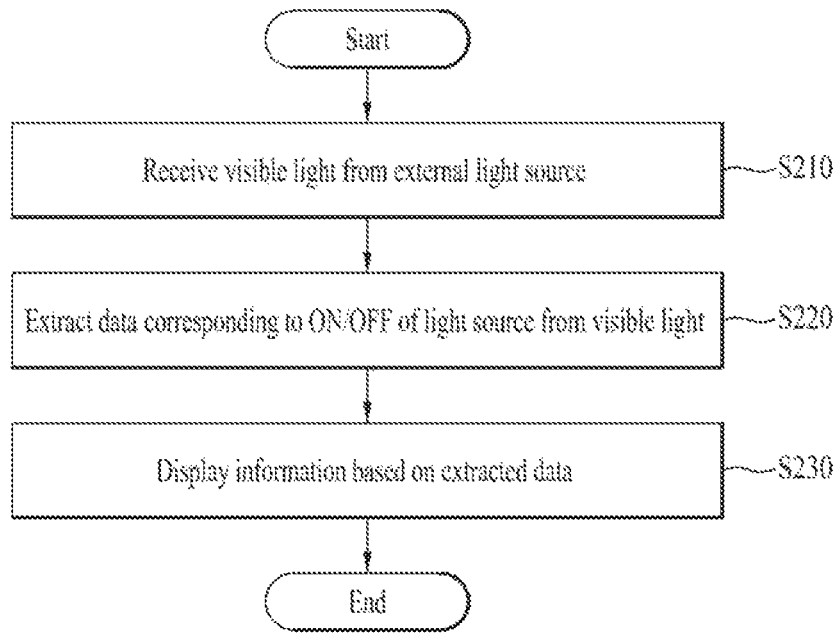
FIG. 2 is a flowchart for explaining an example of a method for performing visible light communication at a mobile terminal according to one embodiment of the present invention.

FIG. 2 is a flowchart for explaining an example of a method for performing visible light communication at a mobile terminal according to one embodiment of the present invention.

Referring to FIG. 2, the controller 180 of the mobile terminal 100 can receive visible light from an external light source through a light receiving unit [S210]. The light receiving unit may include at least one of the illumination sensor 142, first image sensor 121a (or front camera), and second image sensor 121b (or rear camera). In some embodiments, the light receiving unit may include a plurality of illumination sensors.

When a visible light communication function is activated, the controller 180 may activate the light receiving unit and receive visible light through the activate light receiving unit.

For example, the controller 180 may receive visible light using a sensor configured to receive visible light with the highest signal intensity among the illumination sensor 142, first image sensor 121a and second image sensor 121b.

As another example, the controller 180 may receive visible light using a sensor selected by a user from among the illumination sensor 142, first image sensor 121a and second image sensor 121b.

In some embodiments, while the controller 180 receives visible light using any one (first sensor) among the illumination sensor 142, first image sensor 121a and second image sensor 121b, if the intensity of a signal corresponding to the visible light received through the first sensor is lower than a predetermined level, the controller 180 may receive visible light using another one (second sensor) among the illumination sensor 142, first image sensor 121a and second image sensor 121b.

In some embodiments, when the intensity of a signal corresponding to the visible light received through the light receiving unit is lower than a predetermined level, the controller 180 may display a notification message for adjusting a location of the mobile terminal 100.

The controller 180 can extract data corresponding to ON/OFF of the external light source from the received visible light [S220].

The light received by the light receiving unit includes the data corresponding to the ON/OFF of the external light source, and in this case, the data may include digital information (1 or 0).

The controller 180 may extract the data included in the received light by measuring the light amount of the light received by the light reception unit. For example, when the light amount of the received light is greater than a predetermined level, the controller 180 may extract data set to '1'. On the contrary, when the light amount of the received light is smaller than the predetermined level, the controller 180 may extract data set to '0'.

The controller 180 may display information based on the extracted data on the display unit 151.

According one embodiment of the present invention, the mobile terminal 100 can receive data using visible light communication, and information based on the data may include a text, graphic, image, video, audio, and the like.

Figure 3:
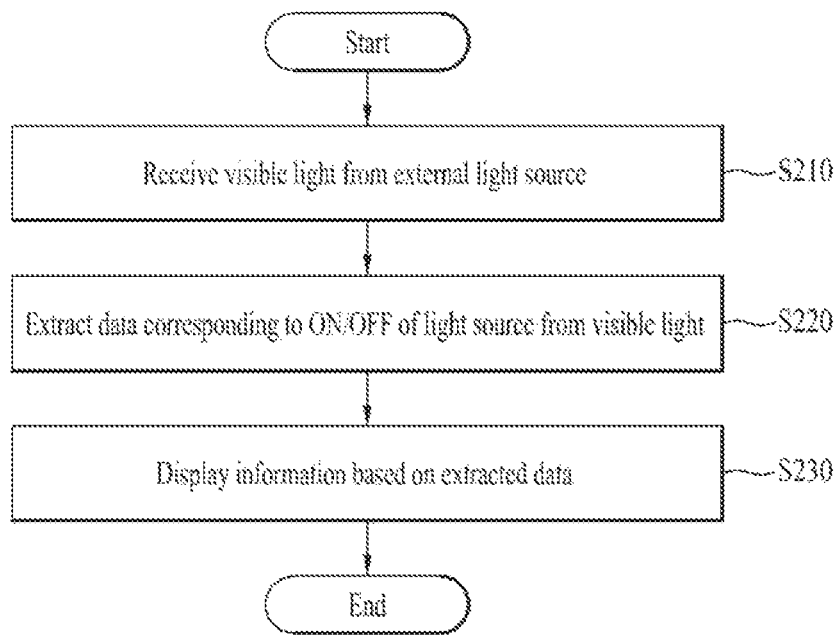
FIG. 3 is a diagram for explaining an example of a light receiving unit included in the mobile terminal according to one embodiment of the present invention.

FIG. 3 is a diagram for explaining an example of the light receiving unit included in the mobile terminal according to one embodiment of the present invention.

The mobile terminal 100 receives visible light from an external light source 300 through the light receiving unit, and the light receiving unit may include at least one of the illumination sensor 142, first image sensor 121a, and second image sensor 121b. When the mobile terminal 100 is placed such that the front surface of the mobile terminal 100 faces upward, visible light may be received through the illumination sensor 142 and/or first image sensor 121a. When the mobile terminal 100 is placed such that the rear surface of the mobile terminal 100 faces upward, visible light may be received through the second image sensor 121b.

For example, the controller 180 may receive visible light using a sensor configured to receive visible light with the highest signal intensity among the illumination sensor 142, first image sensor 121a and second image sensor 121b.

As another example, the controller 180 may receive visible light using a sensor selected by a user from among the illumination sensor 142, first image sensor 121a and second image sensor 121b.

FIG. 4 is a diagram for explaining an example of a method for extracting data from visible light received by the mobile terminal according to one embodiment of the present invention.

The controller 180 of the mobile terminal 100 can extract data from received visible light.

For example, referring to FIG. 4(a), the controller 180 may measure the light amount of visible light using the light receiving unit. When the measured light amount is greater than a predetermined level, the controller may extract data '1'. On the contrary, when the measurement light amount is smaller than the predetermined level, the controller 180 may extract data '0'. Thereafter, the controller 180 may interpret the contents of the extracted data (digital information) and then display information corresponding to the extracted data.

As another example, referring to FIG. 4(b), the controller 180 may measure the light amount of visible light using the light receiving unit. If the period of the pulse signal corresponding to the measured light amount is $T_1$, the controller 180 may extract data '1'. On the other hand, if the period of the pulse signal corresponding to the measured light amount is $T_2$, the controller 180 may extract data '0'. Thereafter, the controller 180 may display information corresponding to the extracted data.

The types of pulse signals corresponding to visible light, a method for extracting data from visible light, a method for interpreting information corresponding to extracted data, and the like can be determined according to communication standards for visible light communication.

According to one embodiment of the present invention, the mobile terminal 100 can increase bandwidth for visible light communication by receiving visible light from a plurality of external light sources simultaneously. Details will be described with reference to FIGS. 5 and 6.

FIG. 5 is a diagram for explaining an example of a method for receiving visible light from each of a plurality of external light sources at the mobile terminal according to one embodiment of the present invention.

The mobile terminal can substantially simultaneously receive visible light from at least two external light sources 510 and 520.

For example, visible light from a first external light source 510 may be received through the illumination sensor 142 in the light receiving unit, and visible light from a second external light source 520 may be received through the second image sensor 121b in the light receiving unit.

As another example, the visible light from the first external light source 510 may be received through the first image sensor 121a, and the visible light from the first external light source 510 may be received through the second image sensor 121b.

In some embodiments, if it is possible to cancel interference between visible light emitted from a plurality of external light sources, visible light can be received through each of the first image sensor 121a and illumination sensor 142 or each of a plurality of illumination sensors.

In visible light communication, a transmitter emits visible light through a plurality of light sources, and as a receiver, the mobile terminal 100 receives the visible light from the plurality of light sources. By doing so, it is possible to not only increase the amount of exchanged data but also improve bandwidth.

The controller 180 of the mobile terminal 100 can arrange data extracted from several pieces of visible light and then interpret the arranged data. In the visible light communication, the transmitter may also transmit information on arrangement order of the data included in the several pieces of visible light through the visible light.

Figure 6:
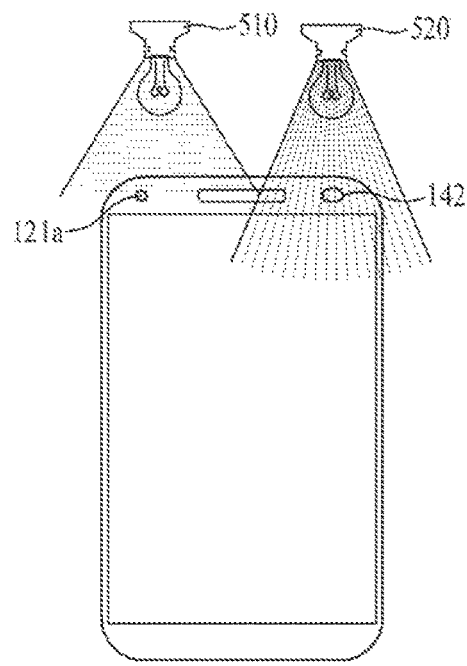
FIG. 6 is a diagram for explaining another example of a method for receiving visible light from each of a plurality of external light sources at the mobile terminal according to one embodiment of the present invention.

FIG. 6 is a diagram for explaining another example of a method for receiving visible light from each of a plurality of external light sources at the mobile terminal according to one embodiment of the present invention.

The mobile terminal can substantially simultaneously receive visible light from at least two external light sources 510 and 520.

For example, visible light from the first external light source 510 may be received through the first image sensor 121*a* in the light receiving unit, and visible light from the second external light source 520 may be received through the illumination sensor 142 in the light receiving unit.

The structure of the first image sensor 121*a* and illumination sensor 142 may be implemented such that the visible light from the first external light source 510 and the visible light from the second external light source 520 does not interfere with each other.

According to one embodiment of the present invention, the mobile terminal may operate as a transmitter for transmitting data in visible light communication. Details will be described with reference to FIG. 7.

Figure 7:
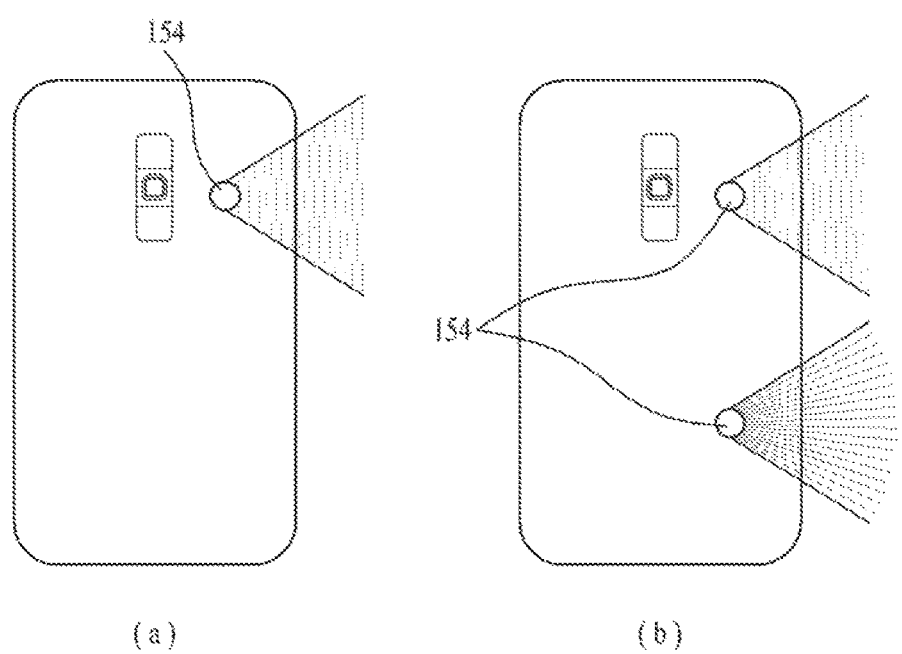
FIG. 7 is a diagram for explaining an example of a method for operating as a transmitter for visible light communication the mobile terminal according to one embodiment of the present invention.

FIG. 7 is a diagram for explaining an example of a method for operating as a transmitter for visible light communication the mobile terminal according to one embodiment of the present invention.

The controller 180 of the mobile terminal 100 may generate a pulse signal with a predetermined frequency corresponding to data to be transmitted and then emit visible light through the light output unit (optical output unit) 154 based on the generated pulse signal. The light output unit 154 may be disposed on the rear surface of the mobile terminal 100, but the present invention is not limited thereto. The light output unit 154 may include a light emitting diode (LED). The controller 180 controls ON/OFF of the light output unit 154 based on the generated pulse signal, and the light output unit 154 may emit visible light in the ON state.

The mobile terminal may have a single light output unit 154 as shown in FIG. 7 (*a*) or a plurality of light output units 154 as shown in FIG. 7(*b*). When the amount of data to be transmitted is large, the controller 180 may substantially simultaneously transmit a plurality of pieces of visible light using a plurality of light output units 154.

For example, the controller 180 may generate the pulse signal with the predetermined frequency using a clock signal used in generating vibration data. When an event (incoming call, incoming text message, alarm, etc.) occurs, the mobile terminal 100 can provide a vibration alarm by outputting vibration data through the haptic module 153. In this case, the controller 180 can adjust the pattern, intensity, and duration of vibration corresponding to the vibration data according to event types, user configurations, and the like. That is, the controller 180 may generate the pulse signal with the predetermined frequency using signals used in generating such vibration data. Specifically, the controller 180 can generate the pulse signal with the predetermined frequency by multiplying a clock signal corresponding to data (digital information) to be transmitted with a frequency signal used in adjusting the pattern, intensity, and duration of vibration.

As another example, the controller 180 may generate the pulse signal with the predetermined frequency using an analog signal (e.g., sinusoidal wave, square wave, etc.) used in generating audio data. To generate the pulse signal with the predetermined frequency, the controller 180 may generate a waveform with a specific frequency using an analog signal from the audio chipset in the controller 180 and then pass the generated waveform with the specific frequency through a switching circuit. If the predetermined frequency is high, the controller 180 may have difficulty in generating the waveform with the desired frequency using the analog signal from the audio chipset. In this case, the controller 180 may use the frequency multiplication technique, that is, the controller 180 may combine a left audio signal and a right audio signal and then perform half wave rectification on the combined signal.

As a further example, the controller 180 may generate the pulse signal with the predetermined frequency using a clock signal used in generating vibration data and an analog signal used in generating audio data.

According to the present embodiment, the invention has an advantage in that the visible light communication can be performed by using the original components and modules in the mobile terminal 100 without any separate components and modules.

Figure 8:
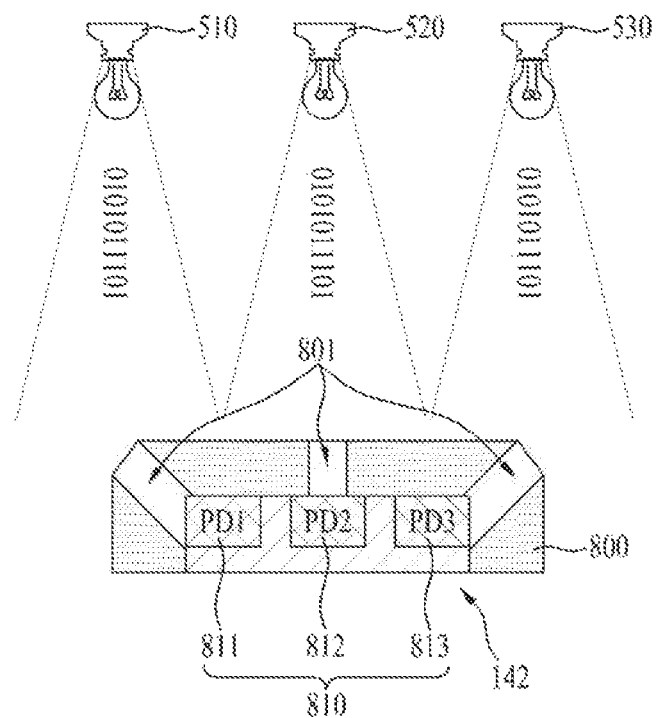
FIG. 8 is a diagram for explaining an example of a structure of a light receiving unit when visible light is received from an external light source by the mobile terminal according to one embodiment of the present invention.

FIG. 8 is a diagram for explaining an example of a structure of a light receiving unit when visible light is received from an external light source by the mobile terminal according to one embodiment of the present invention.

The mobile terminal 100 can substantially simultaneously receive visible light from a plurality of external light sources 510, 520, and 530. Although it is assumed in the present embodiment that the illumination sensor 142, as an example of the light receiving unit, receives visible light from each of the plurality of external light sources 510, 520, and 530, the invention is not limited thereto.

The light receiving unit according to the present embodiment may further include a guide member 800 for guiding a direction of visible light emitted from the external light sources 510, 520, and 530 when the visible light is received from the external light sources 510, 520, and 530. The guide member 800 may be disposed such that it faces the illumination sensor 142 and include a penetration hole 801 for allowing the visible light emitted from the external light sources 510, 520, and 530 to pass therethrough. The penetration hole 801 serves as a guide so that the visible light from the external light sources 510, 520, and 530 can reach the illumination sensor 142 without escape into other places.

Although not shown in the drawing, when the light receiving unit includes the first image sensor 121*a* and/or second image sensor 121*b*, a guide member may be further disposed such that it faces either the first image sensor 121*a* or second image sensor 121*b*.

The illumination sensor 142 may include a plurality of photodiodes 810, and the guide member 800 may have a penetration hole 801 corresponding to each of the plurality of photodiodes 810. For example, the guide member 800 may have a penetration hole 801 facing a first photodiode 811, a penetration hole 802 facing a second photodiode 812, and a penetration hole 803 facing a third photodiode 813. In addition, the first photodiode 811 may receive visible light emitted from the first external light source 510 and passing through the penetration hole 801, the second photodiode 812 may receive visible light emitted from the second external light source 520 and passing through the penetration hole 801, and the third photodiode 813 may receive visible light emitted from the third external light source 530 and passing through the penetration hole 801.

When the mobile terminal 100 receives visible light from each of the plurality of external light sources 510 to 530, the guide member 800 and penetration hole 801 formed therein can reduce communication errors and improve bandwidth by cancelling interference between the visible light.

Figure 9:
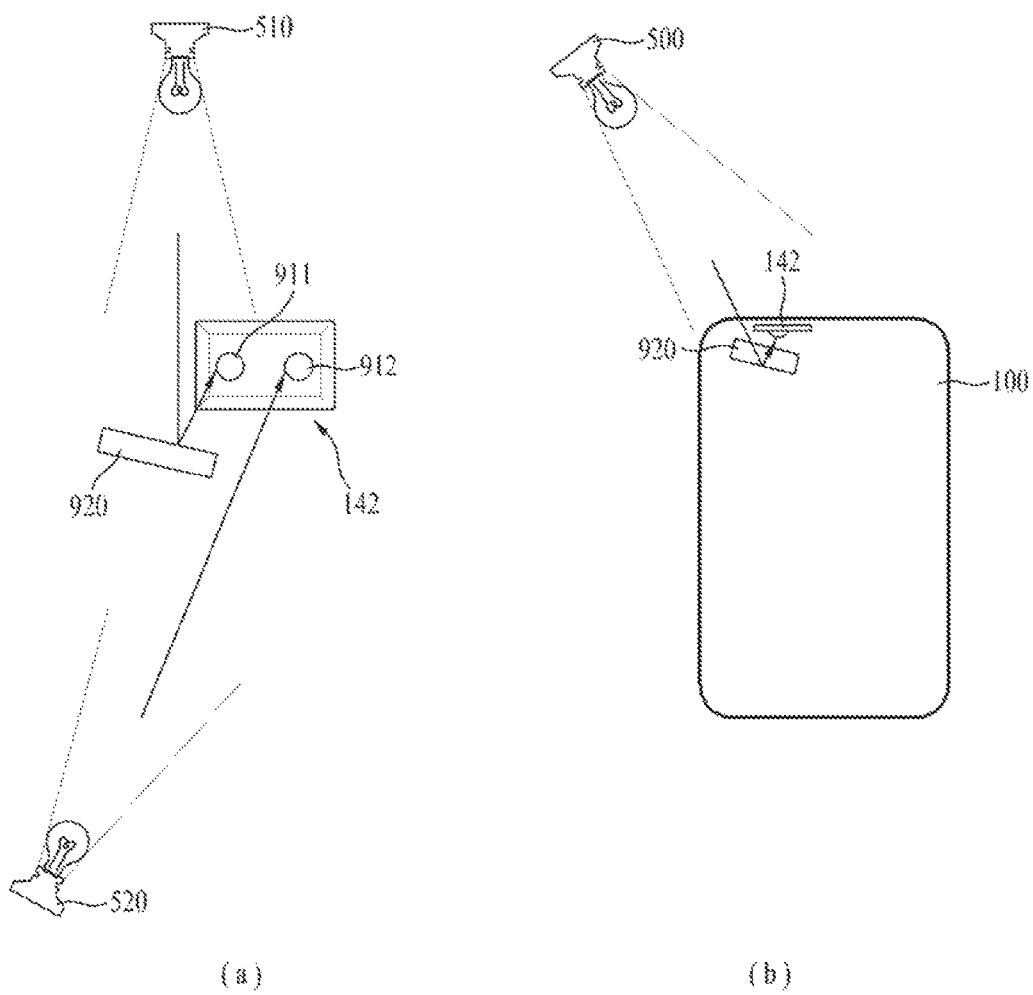
FIG. 9 is a diagram for explaining another example of a structure of a light receiving unit when visible light is received from an external light source by the mobile terminal according to one embodiment of the present invention.

FIG. 9 is a diagram for explaining another example of a structure of a light receiving unit when visible light is received from an external light source by the mobile terminal according to one embodiment of the present invention.

The mobile terminal 100 may receive visible light from a single external light source 500 or a plurality of external light sources 510 and 520. Although it is assumed in the present embodiment that the illumination sensor 142, as an example of the light receiving unit, receives visible light from the external light sources 500, 510, and 520, the embodiment can be equally applied when the light receiving unit is implemented with the first image sensor 121a and/or second image sensor 121b.

Referring to FIG. 9(a), the light receiving unit according to the present embodiment may include the illumination sensor 142, and the illumination sensor 142 may be configured with a first photodiode 911 and a second photodiode 912. In addition, the light receiving unit may further include a guide member 920 for guiding a direction of visible light emitted from an external light source 510. The guide member 920 may include a refraction unit for refracting the visible light emitted from the external light source 510 by a predetermined degree. For example, the guide member 920 may be configured with a prism. Although FIG. 9(a) shows that the guide member 920 reflects the visible light emitted from the external light source 510, the guide member 920 may be implemented such that it reflects visible light emitted from an external light source 520 and other light sources according to its size and location.

The guide member 920 may be disposed separately from the illumination sensor 142 in the mobile terminal 100. When the direction of the visible light emitted from the external light source 510 is not toward the front of the illumination sensor 142, the guide member 920 may serve as a guide for enabling the visible light from the external light source 510 to be received by the illumination sensor 142 by changing the direction of the visible light from the external light source 510.

In the present embodiment, the visible light emitted from the external light source 510 passes through the guide member 920 and then is received by a first photodiode 911, and visible light emitted from the external light source 520 may be received by a second photodiode 912. According to the present embodiment, the light receiving unit can substantially simultaneously receive a plurality of pieces of visible light with different directions by using the guide member 920, and thus interference between the visible light can also be called.

Referring to FIG. 9(b), as the light receiving unit according to one embodiment of the present invention, the illumination sensor 142 may be disposed on a side of the mobile terminal 100. For example, the illumination sensor 142 may be disposed such that the front surface thereof is perpendicular to that of the mobile terminal 100. That is, the illumination sensor 142 may be disposed such that its bottom surface faces the upper edge of the mobile terminal 100. In particular, FIG. 9(b) shows a case in which the width of the illumination sensor 142 is greater than that of the mobile terminal 100 due to the current trend in which the width (bezel) of the mobile terminal 100 is reduced.

Meanwhile, according to one embodiment of the present invention, since a plurality of light receiving units included in the mobile terminal 100 can receive identical visible light from an external light source, the mobile terminal 100 can check data extracted from the received visible light and at the same time, transmit the data to an external device. Details will be described with reference to FIGS. 10 and 11.

Figure 10:
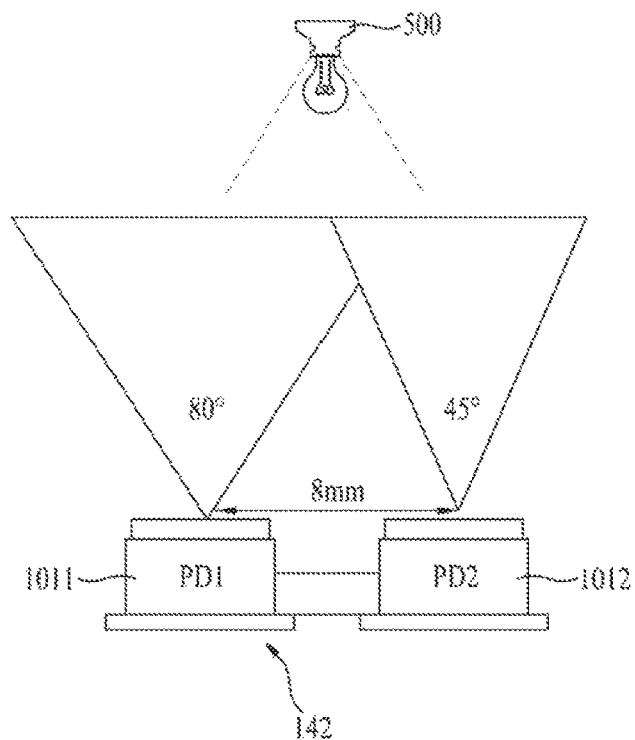
FIG. 10 is a diagram for explaining an example of a method for receiving identical visible light from an external light source using a plurality of light receiving units included in the mobile terminal according to one embodiment of the present invention.

FIG. 10 is a diagram for explaining an example of a method for receiving identical visible light from an external light source using a plurality of light receiving units included in the mobile terminal according to one embodiment of the present invention.

The controller 180 of the mobile terminal 100 can receive identical visible light from an external light source 500 through a plurality of light receiving units. Here, the plurality of light receiving units may mean at least two of the illumination sensor 142, first image sensor 121a, and second image sensor 121b or at least two of a plurality of photodiodes included in the illumination sensor 142. In the present invention, it is assumed that visible light from the external light source 500 is received by a first photodiode 1011 and a second photodiode 1012 included in the illumination sensor 142. The controller 180 extracts data corresponding to ON/OFF of the external light source 500 from the visible light emitted by the external light source 500. In the present embodiment, the extracted data may be identical.

To receive visible light corresponding to the same data through the first photodiode 1011 and second photodiode 1212, focus of the first photodiode 1011 should be matched with that of the second photodiode 1012. In addition, to match the focus of the first and second photodiode 1011 and 1012, the first and second photodiodes 1011 and 1012 may have different field of views (FOVs), and the first and second photodiodes 1011 and 1012 may be disposed apart from each other by a predetermined distance. For example, when the FOVs of the first and second photodiode 1011 and 1012 are 80° and 45°, respectively, and when a distance between the centers of the first and second photodiodes 1011 and 1012 is 8 mm, the focus of the first and second photodiodes 1011 and 1012 can be matched.

Figure 11:
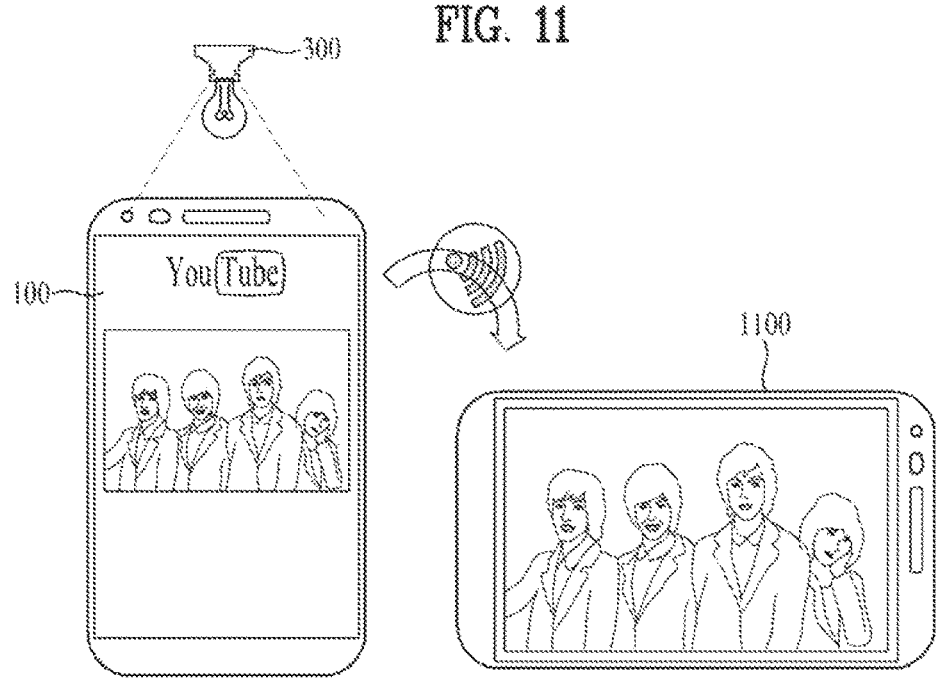
FIG. 11 is a diagram for explaining an example of a method for transmitting data corresponding to the received visible light shown in the embodiment of FIG. 10.

FIG. 11 is a diagram for explaining an example of a method for transmitting data corresponding to the received visible light shown in the embodiment of FIG. 10.

As described above with reference to FIG. 10, the controller 180 of the mobile terminal 100 can extract data from visible light received by each of a plurality of light receiving units (the first and second photodiodes 1011 and 1012), which is emitted from the same external light source 500. In addition, the controller 180 can display data extracted from visible light received by the first photodiode 1011 on the display unit 151 and transmit data extracted from visible light received by the second photodiode 1012 through the wireless communication unit 110 to an external device 1100. The external device 1100 may be a device which is currently connected wirelessly to the mobile terminal 100 and a device which was connected wirelessly to the mobile terminal 100.

According to the present embodiment, since a plurality of light receiving units included in the mobile terminal 100 can receive identical visible light from an external light source, the mobile terminal 100 can display data extracted from the received visible light and at the same time, transmit another data including the same information to an external device interconnected with the mobile terminal 100.

Figure 12:
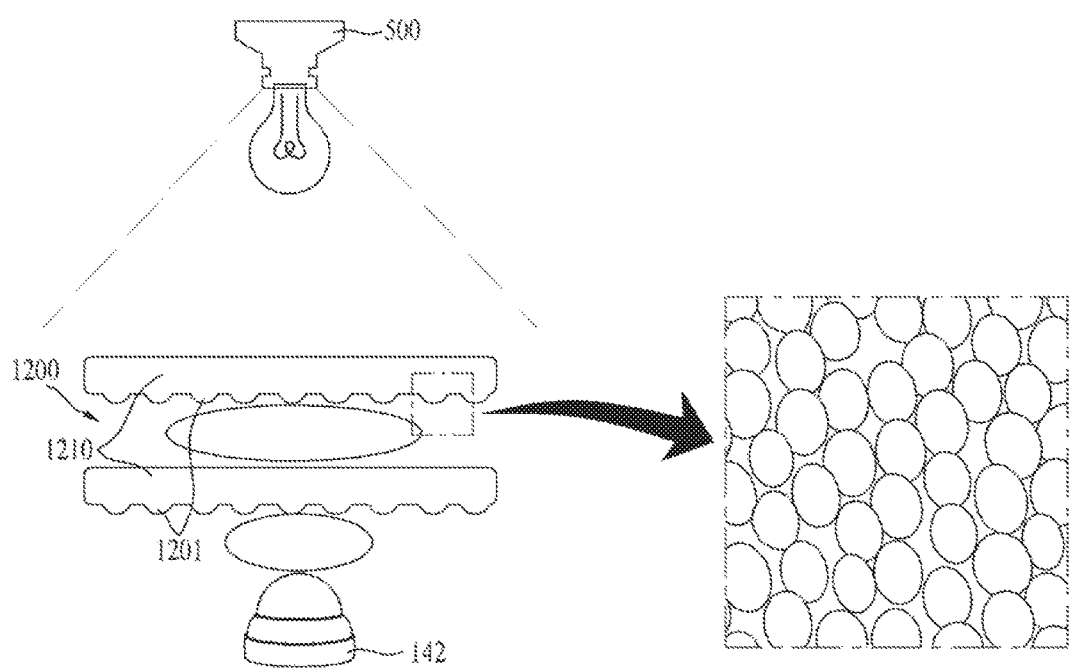
FIG. 12 is a diagram for explaining a further example of a structure of a light receiving unit when visible light is received from an external light source by the mobile terminal according to one embodiment of the present invention.

FIG. 12 is a diagram for explaining an example of a further example of a structure of a light receiving unit when visible light is received from an external light source by the mobile terminal according to one embodiment of the present invention.

The controller 180 of the mobile terminal 100 can receive visible light from the external light source 500 through the light receiving unit. Although it is assumed in the present embodiment that the illumination sensor 142, as an example of the light receiving unit, receives visible light from the external light source 500, the invention is not limited thereto.

The light receiving unit according to the present embodiment may further include a guide member 1200 for guiding a direction of visible light emitted from the external light source 500 when the visible light is received from the external light source 500. The guide member 1200 may be disposed such that it faces the illumination sensor 142, and a convex lens unit 1201 may be formed on a surface of the guide member 1200. The convex lens unit 1201 may enable visible light emitted from the external light source 500 to be collected toward the illumination sensor 142 based on the property of the convex lens. In particular, the convex lens unit 1201 can be efficiently used when the intensity of visible light emitted from the external light source 500 is weak. The convex lens unit 1201 may be disposed on a surface of the guide member 1200 such that it faces the illumination sensor 142.

In some embodiments, the guide member 1200 may include a plurality of layered sheets 1210, and the convex lens unit 1201 may be formed on a surface of each sheet 1210.

The guide member 1200 may be disposed on the front glass of the mobile terminal 100. The guide member 1200 may be made of a transparent material or a material with transparency equal to or higher than a predetermined level.

According to the present embodiment, the invention has an advantage in that even when the intensity of visible light emitted from the external light source 500 is weak, highly sensitive visible communication can be achieved by using the guide member 1200.

Hereinabove, the mobile terminal structure suitable for performing visible light communication has been proposed with reference to the embodiments of the present invention.

The above-described invention can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include the control unit 180 of the terminal. Therefore, the above embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

INDUSTRIAL APPLICABILITY

The present invention relates to a mobile terminal and the invention has industrial applicability.

What is claimed is:

1. A mobile terminal for performing visible light communication using visible light emitted from a light source, which is turned on/off according to a predetermined condition, the mobile terminal comprising:
a light receiving unit configured to receive visible light; and
a controller configured to extract data corresponding to ON/OFF of the light source from the received visible light,
wherein the light receiving unit comprises at least one of an illumination sensor, a first image sensor disposed on a front surface of the mobile terminal, or a second image sensor disposed on a rear surface of the mobile terminal,
wherein the light receiving unit further comprises a guide member for guiding a direction of the visible light emitted from the light source,
wherein the guide member is disposed such that the guide member faces the at least one of the illumination sensor, the first image sensor, or the second image sensor,
wherein the guide member is shaped to form a penetration hole that allows the visible light emitted from the light source to pass therethrough, and
wherein the guide member comprises a plurality of layered sheets, and wherein a convex lens unit is formed on a surface of each of the sheets.

2. The mobile terminal of claim 1, wherein the guide member comprises a refraction unit for refracting the visible light emitted from the light source by a predetermined degree, and wherein the visible light refracted by the refraction unit is received by the at least one of the illumination sensor, the first image sensor, or the second image sensor.

3. The mobile terminal of claim 2, wherein the refraction unit is disposed separately from the illumination sensor, the first image sensor, and the second image sensor.

4. The mobile terminal of claim 2, wherein when the light receiving unit comprises the illumination sensor, the illumination sensor is disposed such that a front surface of the illumination sensor is perpendicular to the front surface of the mobile terminal.

5. The mobile terminal of claim 1, wherein when the light receiving unit comprises the illumination sensor and the first image sensor, the illumination sensor is configured to receive visible light from a first external light source, and the first image sensor is configured to receive visible light from a second external light source.

6. The mobile terminal of claim 5, wherein the guide member comprises a refraction unit for refracting the visible light emitted from the light source by a predetermined degree, and wherein the visible light from the first light source passes through the refraction unit and then is received by the illumination sensor.

7. The mobile terminal of claim 5, wherein the guide member comprises a refraction unit for refracting the visible light emitted from the light source by a predetermined degree, and wherein the visible light from the second light source passes through the refraction unit and then is received by the first image sensor.

8. A mobile terminal for performing visible light communication using visible light emitted from a light source, which is turned on/off according to a predetermined condition, the mobile terminal comprising:
a light receiving unit configured to receive visible light; and a controller configured to extract data corresponding to QN/QFF of the light source from the received visible light, wherein the light receiving unit comprises at least one of an illumination sensor, a first image sensor disposed on a front surface of the mobile terminal, or a second image sensor disposed on a rear surface of the mobile terminal, wherein the light receiving unit further comprises a guide member for guiding a direction of the visible light emitted from the light source, wherein the illumination sensor comprises a plurality of photodiodes, wherein the guide member comprises a penetration hole corresponding to each of the plurality of photodiodes, and wherein the guide member comprises a plurality of layered sheets, and wherein a convex lens unit is formed on a surface of each of the sheets.

9. The mobile terminal of claim 8, wherein a first photodiode among the plurality of photodiodes is configured to receive visible light from a first external light source, and a second photodiode among the plurality of photodiodes is configured to receive visible light from a second external light source.

10. The mobile terminal of claim 1, wherein when the light receiving unit comprises the first image sensor and the second image sensor, the first image sensor is configured to receive visible light from a first external light source, and the second image sensor is configured to receive visible light from a second external light source.

11. The mobile terminal of claim 1, wherein when the light receiving unit comprises the illumination sensor and the second image sensor, the illumination sensor is configured to receive visible light from a first external light source, and the second image sensor is configured to receive visible light from a second external light source.

12. The mobile terminal of claim 1, wherein the light receiving unit comprises the illumination sensor comprising a first photodiode and a second photodiode, and wherein the first and second photodiodes are disposed apart from each other by a predetermined distance.

13. The mobile terminal of claim 12, wherein the first and second photodiodes are configured to receive visible light from an identical light source, and wherein data extracted from the first photodiode is identical to data extracted from the second photodiode.

14. The mobile terminal of claim 12, wherein a field of view (FOV) of the first photodiode is different from an FOV of the second photodiode, and wherein focus of the first photodiode is matched with focus of the second photodiode in the state in which the first and second photodiodes are apart from each other by the predetermined distance.

15. The mobile terminal of claim 12, further comprising:
a display unit; and
a wireless communication unit,
wherein the controller is further configured to:
cause the display unit to display data extracted from visible light received by the first photodiode; and
cause the wireless communication unit to transmit data extracted from visible light received by the second photodiode to an external device.

16. A mobile terminal for performing visible light communication using visible light emitted from a light source, which is turned on/off according to a predetermined condition, the mobile terminal comprising:
a light receiving unit configured to receive visible light; and
a controller configured to extract data corresponding to QN/QFF of the light source from the received visible light,
wherein the light receiving unit comprises at least one of an illumination sensor, a first image sensor disposed on a front surface of the mobile terminal, or a second image sensor disposed on a rear surface of the mobile terminal,
wherein the light receiving unit further comprises a guide member for guiding a direction of the visible light emitted from the light source,
wherein a convex lens unit is formed on a surface of the guide member, and
wherein the guide member comprises a plurality of layered sheets, and wherein the convex lens unit is formed on a surface of each of the sheets.

17. The mobile terminal of claim 16, wherein the convex lens unit is disposed such that the convex lens unit faces the illumination sensor.

* * * * *